US009251600B2

(12) United States Patent
Schlosser et al.

(10) Patent No.: US 9,251,600 B2
(45) Date of Patent: Feb. 2, 2016

(54) METHOD AND APPARATUS FOR DETERMINING AN ALPHA VALUE

(71) Applicant: THOMSON LICENSING, Issy de Moulineaux (FR)

(72) Inventors: Markus Schlosser, Hannover (DE); Jobst Horentrup, Wennigsen (DE); Jorge Lacasa, Barcelona (ES)

(73) Assignee: Thomson Licensing, Issy-les Moulineaux (FR)

( * ) Notice: Subject to any disclaimer, the term of this patent is extended or adjusted under 35 U.S.C. 154(b) by 0 days.

(21) Appl. No.: 14/245,367

(22) Filed: Apr. 4, 2014

(65) Prior Publication Data

US 2014/0301639 A1   Oct. 9, 2014

(30) Foreign Application Priority Data

Apr. 9, 2013   (EP) ..................................... 13305459
Sep. 4, 2013   (EP) ..................................... 13306205

(51) Int. Cl.
 *G06T 7/40*   (2006.01)
 *G06K 9/46*   (2006.01)
 *G06T 7/00*   (2006.01)
 *G06T 11/00*   (2006.01)
 (Continued)

(52) U.S. Cl.
 CPC .............. *G06T 7/408* (2013.01); *G06K 9/4652* (2013.01); *G06T 7/0081* (2013.01); *G06T 7/0087* (2013.01); *G06T 11/001* (2013.01); *H04N 5/2622* (2013.01); *H04N 5/272* (2013.01)

(58) Field of Classification Search
 CPC ........ G06K 9/34; G06T 7/0081; G06T 7/408; G06T 2207/10024; G06T 2207/20144
 USPC ......... 382/164, 199, 284, 173, 225, 218, 154, 382/100, 254, 165, 275, 277; 348/587, 586, 348/597, 590; 345/629–641
 See application file for complete search history.

(56) References Cited

U.S. PATENT DOCUMENTS

| | | | | |
|---|---|---|---|---|
| 6,829,389 B1 * | 12/2004 | Arakawa | ............... | G06T 7/0002 382/131 |
| 7,692,664 B2 * | 4/2010 | Weiss | ................... | H04N 5/275 345/589 |
| 2006/0039611 A1 * | 2/2006 | Rother | .................. | G06T 7/0093 382/199 |

(Continued)

OTHER PUBLICATIONS

Kaiming He et al., "A Global Sampling Method for Alpha Matting", 2011 IEEE conference on computer Vision and Pattern Recognition.*

(Continued)

*Primary Examiner* — Mekonen Bekele
(74) *Attorney, Agent, or Firm* — Volpe and Koenig, P.C.

(57) ABSTRACT

A method for determining an alpha value for a candidate pixel of an image in an alpha matting process and an apparatus configured to perform the method are described. A selecting unit selects two or more pairs of foreground pixels and background pixels. A calculating unit calculates for each pair of foreground pixel and background pixel an associated alpha value based on a color of the foreground pixel and a color of the background pixel, as well as a probability function based on the associated alpha value. The probability function is modeled by assuming two or more characteristics of the pixels as statistically independent. A determining unit determines the pair of foreground pixel and background pixel with the highest value of the probability function. A setting unit then sets the alpha value for the candidate pixel to the associated alpha value of the determined pair of foreground pixel and background pixel.

10 Claims, 3 Drawing Sheets

(51) Int. Cl.
*H04N 5/272* (2006.01)
*H04N 5/262* (2006.01)

(56) References Cited

U.S. PATENT DOCUMENTS

| | | | | |
|---|---|---|---|---|
| 2011/0038536 A1* | 2/2011 | Gong | ............... | G06T 7/0081 |
| | | | | 382/164 |
| 2012/0023456 A1* | 1/2012 | Sun | ............... | G06T 7/0081 |
| | | | | 715/863 |
| 2012/0294519 A1* | 11/2012 | He | ............... | G06K 9/34 |
| | | | | 382/164 |
| 2014/0002746 A1* | 1/2014 | Bai et al. | ............... | 348/607 |
| 2014/0003719 A1* | 1/2014 | Bai et al. | ............... | 382/173 |
| 2014/0119643 A1* | 5/2014 | Price | ............... | G06T 7/0081 |
| | | | | 382/164 |

OTHER PUBLICATIONS

Yung-Yu Chuang et al, "A Bayesian Approach to Digital Matting", Proceeding of the 2001 IEEE, published Jan. 2001.*
Kaiming He et al., "A Global Sampling Method for Alpha Matting" 2011 IEEE conference on computer Vision and Pattern Recognition.*
Jorge Lacasa Cabeza, "Explointing local and global knowledge in alpha matting", pp. 49,Date of Submission: Mar. 31, 2013 and Examination Date: Apr. 10, 2013; <http://upcommons.upc.edu/bitstream/handle/2099.1/19819/Master_Thesis_of_Jorge_Lacasa_Cabeza.pdf?sequence=4&isAllowed=y>.*
Ruzon et al., "Alpha Estimation in Natural Images", IEEE Conference on Computer Vision and Pattern Recognition 2000, vol. 1, Jun. 2000, pp. 18-25.

* cited by examiner

METHOD AND APPARATUS FOR DETERMINING AN ALPHA VALUE

This application claims the benefit, under 35 U.S.C. §119 of European Patent Application No. 13305459.3, filed Apr. 9, 2013 and European Patent Application No. 13306205.9, filed Sep. 4, 2013.

FIELD OF THE INVENTION

The invention relates to a method and an apparatus for performing alpha matting. In particular, the invention relates to a method and an apparatus for determining an alpha value for a candidate pixel of an image in an alpha matting process, which make use of a probability function that is based on an information theoretical analysis.

BACKGROUND OF THE INVENTION

Alpha matting refers to the problem of softly extracting a foreground object out of an image. In contrast to binary segmentation, where each pixel is either classified as fully foreground or background, alpha matting recognizes the existence of "mixed" pixels. A major reason for such mixed pixels is the limited resolution of cameras, where light from the foreground object and the background contribute to the incoming light of a CCD element. Other reasons can be motion-blur and (semi-) transparencies in the object itself. Alpha matting and thus the soft extraction of objects from a still image or a video sequence is a fundamental problem in computer vision in general and movie post-production in particular.

The mixing coefficient is typically called "alpha". It is defined to be between 0 and 1, i.e., 0% and 100%, and describes the fraction to which light from the foreground object contributed to the incoming light on an image sensor element, i.e. to an image pixel. An alpha matting algorithm tries to estimate this alpha coefficient, as well as the unmixed foreground and background colors. Each (unmixed) color is defined by three parameters, e.g. R, G, and B values in case of the RGB color space. Alpha matting hence needs to determine seven unknowns from only three knowns. The problem is thus ill-posed and requires additional constraints.

Many algorithms for estimating alpha mattes have been developed over the recent years. Their computational complexity is usually very high, often preventing their application in professional post-production of high-resolution images. However, the achievable results are usually much more visually appealing than results of a binary segmentation.

Wang et al.: "*Image and Video Matting: A Survey*", Foundations and Trends in Computer Graphics and Vision, Vol. 3 (2007), pp. 97-175, provides a good overview over the state of the art of alpha matting as of 2007. A number of different approaches exist today, where significant progress has been made over the recent years. Generally a distinction is made between two fundamental approaches to solve the matting problem, namely color sampling based methods and propagation (affinity) based methods.

Most of these algorithms assume that a trimap is provided in addition to the input image or sequences thereof. The trimap indicates three different types of regions: known foreground, known background, and an unknown region for which alpha values shall be estimated.

Color sampling based methods try to explain an observed color in the unknown region with the help of known pixels from nearby foreground and background regions. They make the assumption that the true unmixed colors that produced the observed color of the unknown pixel can be found more or less nearby in image space. A further distinction is made between parametric and non-parametric versions. The former fit a parametric statistical model, e.g. a Gaussian or a mixture of Gaussians, to the color distribution of known close-by image regions. The latter ones directly use pairs of individual samples to estimate alpha values. Recent algorithms show a trend towards non-parametric approaches. It seems to be difficult to build adequate models especially for highly textured image areas.

In the second category, propagation-based methods try to estimate the alpha values based on affinities between neighboring pixels. Pixels in the unknown region with high affinity should receive similar values. If the input image adheres to certain constraints, the algorithm may exactly recover the ground truth alpha matte. An important example is the color line model, which was used by A. Levin et al.: "*A Closed-Form Solution to Natural Image Matting*", IEEE Transactions on Pattern Analysis and Machine Intelligence, Vol. 30 (2008), pp. 228-242, to derive a closed-form solution based on the now widely used matting Laplacian. This closed-form solution, however, requires finding a global optimum over all pixels in the unknown region, which is computationally expensive. Furthermore, textured images as well as broad unknown areas still tend to be challenging.

Latest developments in the art combine the two fundamental approaches. In a first stage, a sampling-based matting algorithm is used to get a good initial estimate of the alpha matte. In a second stage, the results of the first stage are refined by a propagation-based optimization of the alpha matte (e.g. using the matting Laplacian). Two recent representatives of this class of algorithms are described by E. S. L. Gastal et al.: "*Shared Sampling for Real-Time Alpha Matting*", Computer Graphics Forum, Vol. 29 (2010), pp. 575-584, and K. He et al.: "*A Global Sampling Method for Alpha Matting*", Proceedings of the 2011 IEEE Conference on Computer Vision and Pattern Recognition (CVPR'11) (2011), pp. 2049-2056. As can be seen from the benchmark provided by C. Rhemann et al.: "*A Perceptually Motivated Online Benchmark For Image Matting*", Proceedings of the 2009 IEEE Conference on Computer Vision and Pattern Recognition (CVPR'09) (2009), pp. 1826-1833, they belong to the top-performing algorithms.

In the color-sampling stage, for each pixel in the unknown region multiple pairs of foreground (FG) and background (BG) samples are evaluated with the help of a cost function. The sample pair with the lowest cost is deemed to be the pair that is best suited to estimate the alpha value of the candidate pixel. Designing a cost function that indeed selects the sample pair that best explains the true alpha value of the unknown pixel is an art, and subject of a lot of current research.

Most of the cost functions of recent matting algorithms combine spatial and colorimetric costs to evaluate the suitability of a sample pair. In principle, the smaller the image-space distance of the sampled pixel to the unknown pixel, the better. A spatially close candidate is more likely to be a good candidate than a candidate further away. Furthermore, a pair of FG/BG samples should well model the unknown pixel's color as a linear mixture of themselves. The smaller the deviation of the observed color from the line connecting the collected sample colors, the better.

In general, the cost functions are designed in a somewhat "ad hoc" fashion. Typically, they combine unrelated physical quantities. In the work by E. S. L. Gastal et al., the cost function is defined as a product of an estimated probability and several not normalized distances in color space and image space, all of which are raised to some power. In the work by K. He et al., the cost function is merely a weighted sum of one not normalized distance in color space and two normalized distances in image space. In both cases, the parameters that control the contribution of the individual costs are usually determined experimentally by comparing results with ground-truth data, as available for example from C. Rhemann et al.

SUMMARY OF THE INVENTION

It is an object of the present invention to propose an improved solution for determining an alpha value for a candidate pixel of an image in an alpha matting process.

According to the invention, a method for determining an alpha value for a candidate pixel of an image in an alpha matting process comprises:
  selecting two or more pairs of foreground pixels and background pixels;
  for each pair of foreground pixel and background pixel, calculating an associated alpha value based on a color of the foreground pixel and a color of the background pixel;
  for each pair of foreground pixel and background pixel, calculating a probability function based on the associated alpha value, wherein the probability function is modeled by assuming two or more characteristics of the pixels as statistically independent;
  determining the pair of foreground pixel and background pixel with the highest value of the probability function; and
  setting the alpha value for the candidate pixel to the associated alpha value of the determined pair of foreground pixel and background pixel.

Accordingly, an apparatus configured to determine an alpha value for a candidate pixel of an image in an alpha matting process comprises:
  a selecting unit configured to select two or more pairs of foreground pixels and background pixels;
  a calculating unit configured to, for each pair of foreground pixel and background pixel, calculate an associated alpha value based on a color of the foreground pixel and a color of the background pixel, and to calculate a probability function based on the associated alpha value, wherein the probability function is modeled by assuming two or more characteristics of the pixels as statistically independent;
  a determining unit configured to determine the pair of foreground pixel and background pixel with the highest value of the probability function; and
  a setting unit configured to set the alpha value for the candidate pixel to the associated alpha value of the determined pair of foreground pixel and background pixel.

Also, a computer readable storage medium has stored therein instructions enabling determining an alpha value for a candidate pixel of an image in an alpha matting process, which when executed by a computer, cause the computer to:
  select two or more pairs of foreground pixels and background pixels;
  for each pair of foreground pixel and background pixel, calculate an associated alpha value based on a color of the foreground pixel and a color of the background pixel;
  for each pair of foreground pixel and background pixel, calculate a probability function based on the associated alpha value, wherein the probability function is modeled by assuming two or more characteristics of the pixels as statistically independent;
  determine the pair of foreground pixel and background pixel with the highest value of the probability function; and
  set the alpha value for the candidate pixel to the associated alpha value of the determined pair of foreground pixel and background pixel.

According to the present invention, a sound probability function, and accordingly a sound cost function, are determined based on an information theoretical analysis. The probability function consists of comparable entities for the colorimetric and spatial costs within the framework of non-parametric color sampling. One aspect of the invention is to regard color and space as two statistically independent characteristics of a pixel and to model their probability distribution with the help of exponential functions. Maximizing the joint probability, i.e. the product of the individual probabilities, is then basically identical two minimizing the sum of normalized distances in the exponent. Of course, this idea is extensible to any number of statistically independent characteristics.

A second aspect of the invention is the avoidance of costs for statistical events that do not influence the final outcome. In case a sample pair estimates an unknown pixel to be purely background, its FG sample should have no influence on the calculated cost. The same is true for the BG sample in case the unknown pixel is deemed to belong to the foreground. Therefore, the cost function advantageously employs an alpha-dependent weighting of the spatial costs.

The proposed cost function provides a significant improvement of the quality of the estimated alpha mattes without significantly increasing the computational complexity.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
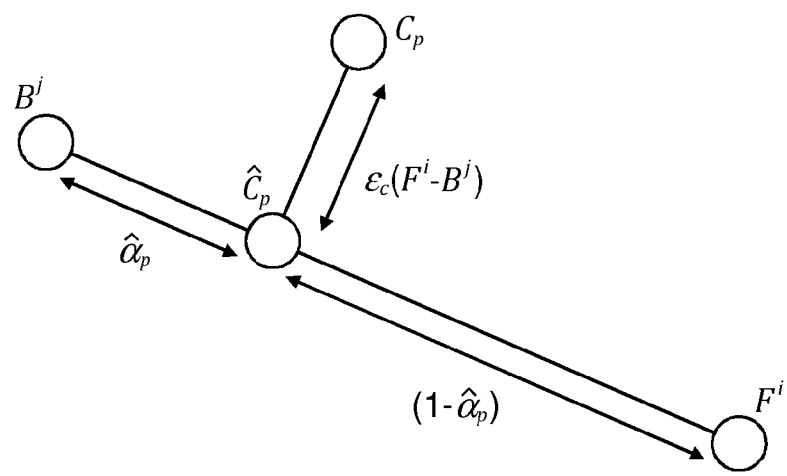
FIG. 1 shows how the estimated alpha value is the result of a projection of the observed pixel colors in 3D color space.

The estimated alpha value for an unknown pixel resulting from a pair of FG and BG samples can be calculated as $$\hat{\alpha}(F^i, B^j) = \max(0, \min(1, \frac{(C_p - B^j)(F^i - B^j)}{\|F^i - B^j\|^2}, \quad (1)$$

where $F^i$ and $B^j$ denote the colors of the FG and BG samples and $C_p$ denotes the color of the unknown pixel. Geometrically, alpha is the result of a projection in 3D color space of the pixel's color onto the line connecting $F^i$ and $B^j$. This projection is illustrated in FIG. 1.

The value $\hat{\alpha}$ is computed as the ratio of the Euclidean distances between $\hat{C}_p$ and $B^j$ and between $F^i$ and $B^j$. Since the color space projection may yield $\hat{\alpha}$ values smaller than 0 or greater than 1, the min and max functions are used to clamp $\hat{\alpha}$ to the interval [0,1].

In the work by K. He et al., the Euclidean distance between $\hat{C}_p$ and $C_p$ in 3D (RGB) color space is then used as a measure of how well the sample pair models the observed color $C_p$. This distance is also referred to as the "chromatic distortion", describing the degree to which the examined sample pair is able to explain the unknown pixel's color through a linear combination of themselves:

$$\epsilon_c(F^i, B^j) = \|C_p - \hat{C}_p\| \tag{2}$$

The smaller the distance $\epsilon_c$, the better the sample pair is deemed to represent the true unmixed colors for the unknown pixel, in turn being better suited as the sample pair finally used to estimate alpha.

The complete cost function used by K. He et al. is defined as $$\epsilon(F^i, B^j) = w \cdot \epsilon_C(F^i, B^j) + \epsilon_S(F^i) + \epsilon_S(B^j), \tag{3}$$

where $\epsilon_s(F^i)$ and $\epsilon_s(B^j)$ denote the spatial costs of the foreground sample and the background sample, respectively. The cost $\epsilon_s(F^i)$ is computed as $$\varepsilon_S(F^i) = \frac{\|X_{F^i} - X_{C_p}\|}{D_F}, \tag{4}$$

where the nominator describes the Euclidean distance of the FG sample to the unknown pixel in image space (X denotes spatial coordinates) and the denominator describes the smallest distance of the unknown pixel to the set of FG samples. The cost $\epsilon_s(B^j)$ is computed accordingly, and w denotes an empirical weighting factor.

If exponential distributions are assumed for the statistical independent random variables chromatic distortion and spatial distance, minimizing the cost function in Equation 3 may be seen as maximizing the joint probability of the observed statistical events. It should, however, be noted that, for true exponential distributions, the spatial distances would need to be normalized by their expected mean value, and not the smallest possible distance. As the difference may, however, be compensated quite accurately by a constant correction factor, this is effectively like changing the empirical weight w.

According to the solution proposed herein, a slightly different approach to model the chromatic distortion is adopted. As the variation in the sampled colors should have a strong influence on the likelihood of the color mix, it is proposed to use the Mahalanobis distance as normalized color distance. The color variation in terms of the observed variance is a measure for the homogeneity or texturedness of the image region.

In principle this is like modeling the FG and BG colors as normally distributed. It should, however, be noted that in order to avoid an averaging of colors, which is probably the reason for the suboptimal results of the parametric color sampling based approaches, the sampled colors are directly used as the mean value of the normal distribution, i.e. without any averaging. The covariance matrices are estimated using basically the smallest possible region, i.e. the 3×3 neighborhood.

Accordingly, this change does not affect the computation of the estimated alpha, but only the chromatic distortion, which now becomes:

$$\epsilon_c(F^i, B^j) = \sqrt{(C_p - \hat{C}_p)^T \cdot S(\hat{C}_p)^{-1} \cdot (C_p - \hat{C}_p)}. \tag{5}$$

The covariance matrix $S(\hat{C}_p)$ for the mixed color $\hat{C}_p$ is thereby obtained as a weighted sum of the covariance matrices $S(F^i)$ and $S(B^j)$:

$$S(\hat{C}_p) = (1-\hat{\alpha})^2 \cdot S(B^j) + \hat{\alpha}^2 \cdot S(F^i). \tag{6}$$

Favorably, fully populated covariance matrices are used for $S(F^i)$, $S(B^j)$ and $S(\hat{C}_p)$. Alternatively, the covariance matrices are populated only on the main diagonal, neglecting the correlation between colors. Finally, a single scalar value may also be assumed for the variance, which is independent of the color components. These simplifications avoid the matrix inversion and reduce the number of divisions, respectively, which limits the additional amount of computation.

For uniform image regions, the values on the main diagonal of the covariance matrix may become arbitrarily small, leading to a huge penalty for the slightest deviation in color. As such a penalty is not quite substantiated by the proposed simple model, and in order to even give a slight advantage to such rather pure colors as well as to avoid numerical instabilities, a small constant is advantageously added to all diagonal elements.

The "clamping" described above for the color projection automatically results in the chromatic distortion being independent of the sampled FG or BG color whenever the examined pixel is estimated to be pure BG or FG, i.e. when $\hat{\alpha}$ equals zero or one. In addition, the newly introduced mixing of the covariance matrices also produces a natural weighting between the two colors for arbitrary alpha values in-between.

In the approaches by used by K. He et al. and C. Rhemann et al. the influence of the spatial costs is independent of the estimated alpha value $\hat{\alpha}$. According to a further aspect of the present solution an alpha-dependent weighting of the spatial costs is used. Exemplarily, the overall cost function of K. He et al. is extended as follows:

$$\epsilon(F^i, B^j) = w \cdot \epsilon_C(F^i, B^j) + w_F(\hat{\alpha}) \cdot \epsilon_s(F^i) + w_B(\hat{\alpha}) \cdot \epsilon_s(B^j). \tag{7}$$

The weighting functions $w_F$ and $w_B$ are functions of a and as such functions of $(F^i, B^j)$.

Generally, $w_F(\hat{\alpha})$ can be any function that has its minimum at $\hat{\alpha}=0$ and increases monotonically with $\hat{\alpha}$. Similarly, $w_B(\hat{\alpha})$ can be any function that has its minimum at $\hat{\alpha}=1$ and monotonically decreases with $\hat{\alpha}$.

Intuitively, this models that when $\hat{\alpha}$ is 0, i.e. the pixel is estimated as pure BG, the influence of the FG candidate's spatial distance should be minimal or it should not have any influence at all. Vice versa, when $\hat{\alpha}$ is 1, i.e. the pixel is estimated as pure FG, the influence of the BG candidate's spatial distance should be minimal or it should not have any influence at all. A key aspect of the proposed solution is that both spatial distances should only contribute to the overall costs for truly mixed pixels in the unknown region, for which $0 < \hat{\alpha} < 1$.

To give an example, the two functions may be (piecewise) linear functions. Alternatively, the functions are defined by three different intervals on the $\hat{\alpha}$ axis. As a further alternative, for any value of $\hat{\alpha}$ the functions fulfill the condition $$w_F(\hat{\alpha}) + w_B(\hat{\alpha}) = c, \tag{8}$$

with c a constant. According to yet another alternative, the two functions are symmetric to each other:

$$w_F(\hat{\alpha}) = w_B(1-\hat{\alpha}). \tag{9}$$

Figure 2:
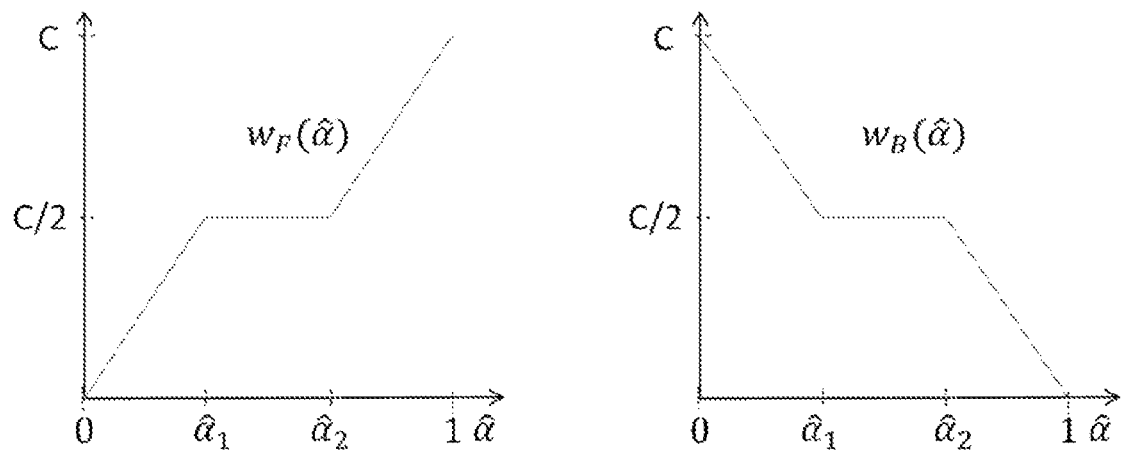
FIG. 2 illustrates one example of a pair of weighting functions.

An example of a function pair is illustrated in FIG. 2. In this example the $\hat{\alpha}$ axis is divided into three intervals defined by $0<\hat{\alpha}_1 \leq \hat{\alpha}_2<1$, where $\hat{\alpha}_2=1-\hat{\alpha}_1$. In the first interval, ranging from 0 to $\hat{\alpha}_1$, the FG costs are attenuated and completely suppressed for $\hat{\alpha}=0$. This models that in this interval the FG sample's spatial cost is less important. The BG costs in this interval are in turn amplified to keep the balance of the spatial costs with the color cost $\epsilon_c$. A sole attenuation of the FG spatial costs without any compensation would implicitly increase the influence of the color cost on the overall costs. In the middle interval, between $\hat{\alpha}_1$ and $\hat{\alpha}_2$, neither of the FG or BG spatial costs is attenuated or amplified, giving equal importance to both costs. In the last interval, between $\hat{\alpha}_2$ and 1, the BG costs are attenuated and completely suppressed for $\hat{\alpha}=1$. The FG costs are amplified for the same reason as the BG costs in the first interval.

Figure 3:
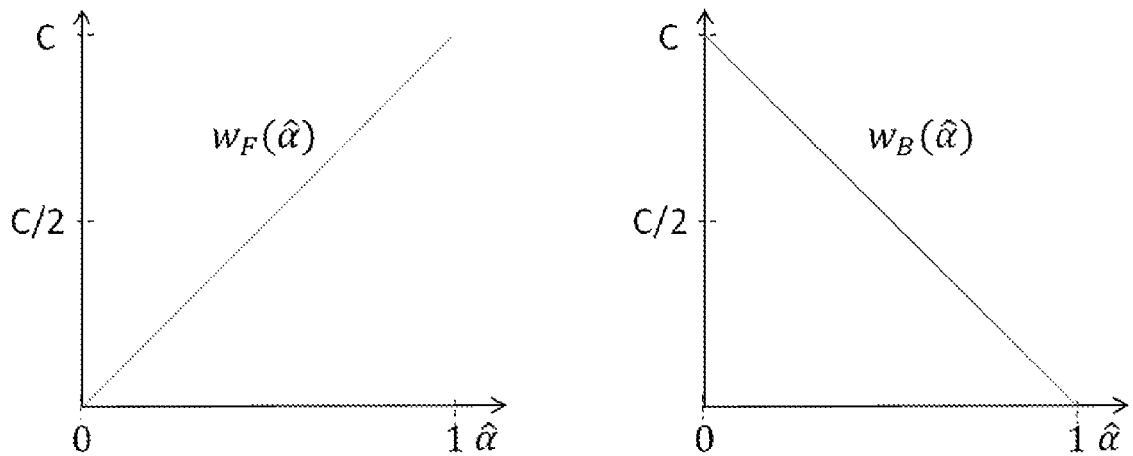
FIG. 3 illustrates a further example of a pair of weighting functions.

The case of $\hat{\alpha}_1=\hat{\alpha}_2=0.5$ is illustrated in FIG. 3.

Finally, the two functions can also be defined as:

$$w_F(\hat{\alpha}) = \begin{cases} 0 & \text{if } \hat{\alpha} = 0 \\ C & \text{if } \hat{\alpha} = 1 \\ \frac{C}{2} & \text{otherwise} \end{cases} \quad (10)$$

$$w_B(\hat{\alpha}) = \begin{cases} C & \text{if } \hat{\alpha} = 0 \\ 0 & \text{if } \hat{\alpha} = 1 \\ \frac{C}{2} & \text{otherwise.} \end{cases} \quad (11)$$

In this case complete suppression of one spatial cost, and amplification of the other spatial cost, is only applied in the unmixed color cases, i.e. when $\hat{\alpha}$ equals 0 or 1. For all other cases the two costs are equally weighted.

Figure 4:
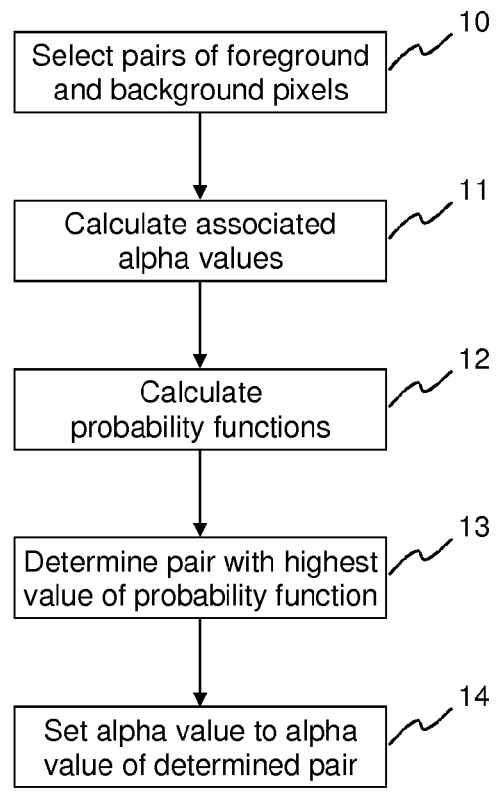
FIG. 4 schematically illustrates a method according to the invention.

FIG. 4 schematically illustrates a method according to the invention for determining an alpha value for a candidate pixel of an image in an alpha matting process. In a selecting step 10 two or more pairs of foreground pixels and background pixels are selected. Then, for each pair of foreground pixel and background pixel an associated alpha value is calculated 11 based on a color of the foreground pixel and a color of the background pixel. Also, for each pair of foreground pixel and background pixel a probability function is calculated 12 based on the associated alpha value. The probability function is modeled by assuming two or more characteristics of the pixels as statistically independent. In a subsequent determining step 13 the pair of foreground pixel and background pixel with the highest value of the probability function is determined. Finally, the alpha value for the candidate pixel is set 14 to the associated alpha value of the determined pair of foreground pixel and background pixel.

Figure 5:
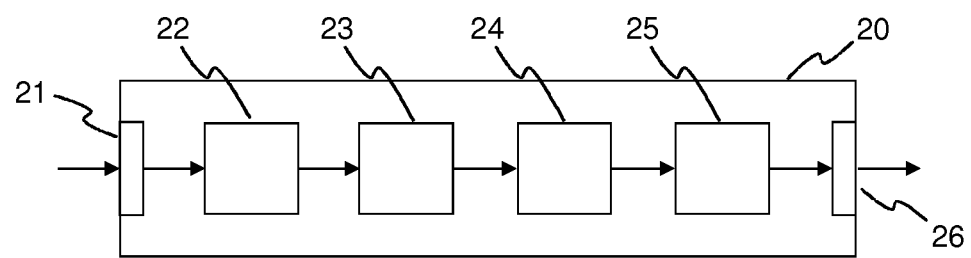
FIG. 5 schematically illustrates an apparatus configured to perform a method according to the invention.

An apparatus 20 configured to perform the method according to the invention is schematically depicted in FIG. 5. The apparatus 20 has an input 21 for receiving an image or a sequence of images and a selecting unit 22 for selecting 10 two or more pairs of foreground pixels and background pixels. A calculating unit 23 calculates 11, 12 for each pair of foreground pixel and background pixel an associated alpha value based on a color of the foreground pixel and a color of the background pixel, and a probability function based on the associated alpha value. The probability function is modeled by assuming two or more characteristics of the pixels as statistically independent. A determining unit 24 determines 13 the pair of foreground pixel and background pixel with the highest value of the probability function. A setting unit 25 then sets 14 the alpha value for the candidate pixel to the associated alpha value of the determined pair of foreground pixel and background pixel. The results obtained by the setting unit 25 are preferably output via an output 26 in the form of an alpha value for a pixel or in the form of a grey scale image or a sequence of grey scale images, which are spatially aligned with the input image or sequence of images. Of course, the different units 22, 23, 24, 25 may likewise be fully or partially combined into a single unit or implemented as software running on a processor.

REFERENCES

J. Wang et al.: "*Image and Video Matting: A Survey*", Foundations and Trends in Computer Graphics and Vision, Vol. 3 (2007), pp. 97-175.

E. S. L. Gastal et al.: "*Shared Sampling for Real-Time Alpha Matting*", Computer Graphics Forum, Vol. 29 (2010), pp. 575-584

K. He et al.: "*A Global Sampling Method for Alpha Matting*", Proceedings of the 2011 IEEE Conference on Computer Vision and Pattern Recognition (CVPR'11) (2011), pp. 2049-2056.

C. Rhemann et al.: "A Perceptually Motivated Online Benchmark For Image Matting", Proceedings of the 2009 IEEE Conference on Computer Vision and Pattern Recognition (CVPR'09) (2009), pp. 1826-1833 (www.alphamatting.com).

[A. Levin et al.: "*A Closed-Form Solution to Natural Image Matting*", IEEE Transactions on Pattern Analysis and Machine Intelligence, Vol. 30 (2008), pp. 228-242.

What is claimed is:

1. A method for determining an alpha value for a candidate pixel of an image in an alpha matting process, the method comprising:
    selecting two or more pairs of foreground pixels and background pixels;
    for each pair of foreground pixel and background pixel, calculating an associated alpha value based on a color of the foreground pixel and a color of the background pixel;
    for each pair of foreground pixel and background pixel, calculating a probability function based on the associated alpha value, wherein the probability function is modeled by assuming two or more characteristics of the pixels as statistically independent;
    determining the pair of foreground pixel and background pixel with the highest value of the probability function; and
    setting the alpha value for the candidate pixel to the associated alpha value of the determined pair of foreground pixel and background pixel,
    wherein a cost function is derived from the probability function such that determining the lowest value of the cost function is equivalent to determining the highest value of the probability function,
    wherein the cost function employs an alpha-dependent weighting of spatial costs, and
    wherein the alpha-dependent weighting is defined such that for a pixel being estimated as pure background the influence of the spatial distance of a foreground candidate is minimal, and that for a pixel being estimated as pure foreground the influence of the spatial distance of a background candidate is minimal.

2. The method according to claim 1, wherein the two or more characteristics of the pixels comprise color and space.

3. The method according to claim 1, wherein sampled colors are directly used as a mean value of an assumed normal distribution without any averaging.

4. The method according to claim 1, wherein for deriving the cost function probability distributions of the two or more characteristics are modeled with the help of exponential functions such that the cost function comprises normalized distances in color and space.

5. The method according to claim 4, wherein for determining colorimetric costs a Mahalanobis distance is used as a normalized color distance.

6. An apparatus configured to determine an alpha value for a candidate pixel of an image in an alpha matting process, wherein the apparatus comprises:
   a selecting unit configured to select two or more pairs of foreground pixels and background pixels;
   a calculating unit configured to, for each pair of foreground pixel and background pixel, calculate an associated alpha value based on a color of the foreground pixel and a color of the background pixel, and to calculate a probability function based on the associated alpha value, wherein the probability function is modeled by assuming two or more characteristics of the pixels as statistically independent;
   a determining unit configured to determine the pair of foreground pixel and background pixel with the highest value of the probability function; and
   a setting unit configured to set the alpha value for the candidate pixel to the associated alpha value of the determined pair of foreground pixel and background pixel,
   wherein a cost function is derived from the probability function such that determining the lowest value of the cost function is equivalent to determining the highest value of the probability function,
   wherein the cost function employs an alpha-dependent weighting of spatial costs, and
   wherein the alpha-dependent weighting is defined such that for a pixel being estimated as pure background the influence of the spatial distance of a foreground candidate is minimal, and that for a pixel being estimated as pure foreground the influence of the spatial distance of a background candidate is minimal.

7. The apparatus according to claim 6, wherein the two or more characteristics of the pixels comprise color and space.

8. The apparatus according to claim 6, wherein sampled colors are directly used as a mean value of an assumed normal distribution without any averaging.

9. The apparatus according to claim 6, wherein for deriving the cost function probability distributions of the two or more characteristics are modeled with the help of exponential functions such that the cost function comprises normalized distances in color and space.

10. The apparatus according to claim 9, wherein for determining colorimetric costs a Mahalanobis distance is used as a normalized color distance.

* * * * *